S. R. HUNTER.

Broadcast-Seeder.

No. 23,769.

Patented Apr. 26, 1859.

Witnesses:

P B Alem Davis
De Forest B Davis

Inventor:

Stephen R Hunter

UNITED STATES PATENT OFFICE.

STEPHEN R. HUNTER, OF CORTLAND, NEW YORK.

IMPROVEMENT IN SEEDING-MACHINES.

Specification forming part of Letters Patent No. 23,769, dated April 26, 1859.

*To all whom it may concern:*

Be it known that I, STEPHEN R. HUNTER, of Cortland, in the county of Cortland and State of New York, have invented a new and Improved Broadcast-Seeding Machine; and I do hereby declare that the following is a full, clear, and exact description of the same, reference being had to the annexed drawings, making a part of this specification, in which—

Figure 1:
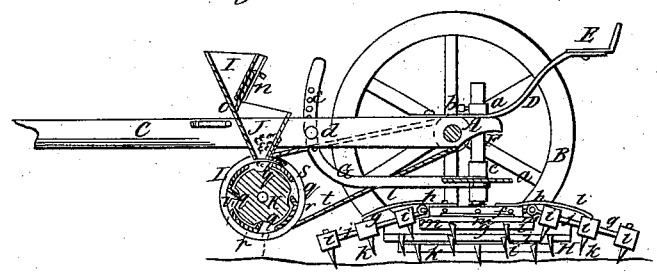
Figure 3:
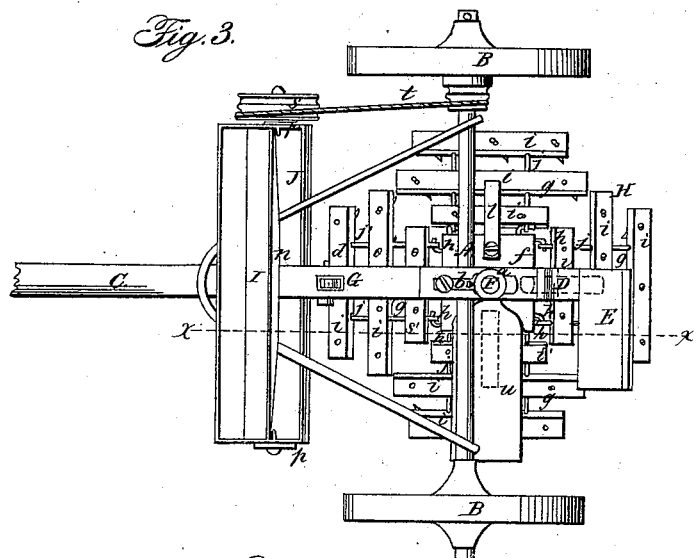
Figure 2:
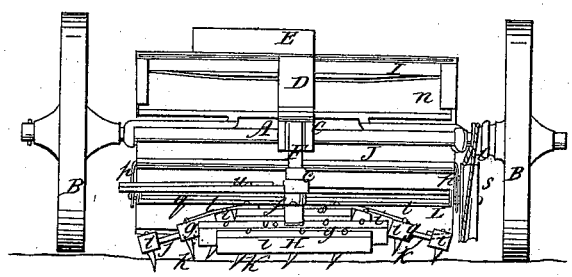

Figure 1 is a side sectional view of my invention, taken in the line $x\,x$, Fig. 3. Fig. 2 is a back view of the same. Fig. 3 is a plan or top view of the same.

Similar letters of reference indicate corresponding parts in the several figures.

This invention consists in combining with a broadcast seed-distributing device a rotary drag or harrow, constructed in a novel way, applied to the machine, and arranged as hereinafter fully shown and described, whereby the drag or harrow is made to conform to the inequalities of the surface of the ground, its rotation insured by the forward movement of the machine, and the seed covered in a proper manner directly after being dropped.

To enable those skilled in the art to fully understand and construct my invention, I will proceed to describe it.

A represents an axle; B B, its wheels; and C is a draft-pole, which is permanently attached to the axle at its center.

To the back end of the draft-pole C an elastic plate, D, is attached, said plate having a driver's seat, E, on its outer end.

Through the back part of the draft-pole C a vertical arbor, F, passes loosely. This arbor has a collar or boss, $a$, on its upper end, secured by a set-screw, $b$, and on the arbor F, below the draft-pole C, a collar, $c$, is placed, said collar having a curved bar, G, attached, which bar passes up through a mortise in the draft-pole, and has a pin, $d$, passing through either of a series of holes, $e$, in said bar. (See Fig. 1.)

To the lower end of the arbor F a square metal plate, $f$, is attached, and to each edge of the plate a frame, $g$, is attached by hinges or joints $h$. These frames may be formed of parallel wooden bars $i$, connected by traverse-rods $j$, the wooden bars having teeth $k$ driven obliquely through them, as shown more particularly in Figs. 1 and 2.

To the plate $f$ springs $l$ are attached, said springs bearing one on each frame $g$, and having a tendency to keep them depressed or bearing on the ground, and in the edges of the plate $f$ pins or stops $m$ are placed, one in each, said stops or pins serving as bearings for the frames $g$ when the latter are depressed beyond a certain point. The plate $f$, with its frames $g$ and arbor F, form a rotary drag or harrow, H, and its operation will be presently described.

On the draft-pole C, a little in front of the curved bar G, a seed-box, I, is placed. This seed-box is equal in length to the diameter of the harrow H. This seed-box is transversely of V form, and has a slide, $n$, at its back side, by adjusting which the opening $o$ at the bottom of the box may be graduated as desired. The seed-box I, by means of the opening $o$, communicates with a similar seed-box, J, which is placed below the box I and directly over a cylinder, K, the axis of which has its bearings in pendants $p$, attached to the ends of the seed-box J. The cylinder K is equal in length to the seed-boxes I J, and it has grooves $q$ made in it longitudinally its whole length. The cylinder K is encompassed by a shell, L, which is slotted corresponding to the grooves in the cylinder K and at one side of each slot a flange, $r$, is turned inward into the grooves $q$, as shown clearly in Fig. 1.

To one end of the axis of cylinder K a pulley, $s$, is attached, said pulley having a cord, $t$, passing around it, which cord also passes around a pulley on one of the wheels B.

To the collar $c$ on the arbor F a plate, $u$, is attached, on which one foot of the driver rests or bears.

The operation is as follows: The seed to be sown is placed in the box I and the slide $m$ adjusted so as to permit the seed to fall into the box J as rapidly as necessary, the supplemental box I favoring an equal or uniform supply of seed to cylinder K. The seed passes from box J into the grooves $q$, the capacity of which may be varied by adjusting the shell L, the flanges $r$, by being moved within the grooves, determining their capacity. The seed is distributed as the machine is drawn along by the revolution of the cylinder K, and the drag or harrow H, as it rotates, covers the seed, the drag, in consequence of being formed of frames $g$, connected to the plate $f$ by joints $h$, being allowed to conform perfectly to the inequalities of the surface of the ground, the rotation of the harrow being insured by the oblique teeth $k$, aided by the pressure of the foot of the driver on plate $u$, the springs $l$ transmitting the pressure to the frames $g$, and at the same time permitting the frames to rise to conform to the undulating surface of the ground. The frames $g$, it will be understood, rise separately, while the harrow as a whole is allowed to rise bodily in consequence of its arbor F passing through the collar $c$.

By this invention seed may be sown broadcast in a very even manner, the drag or harrow H not only covering it, but also serving to equalize or distribute it evenly in case of any unequal distribution by the seed-distributing device.

I am aware that rotary harrows have been previously devised and arranged in various ways, and that inclined or oblique teeth $k$ have been used. I therefore do not claim, irrespective of construction and adaptation, a rotary harrow; but I do claim as new and desire to secure by Letters Patent—

The seed-distributing cylinder K, with adjustable shell L, in combination, with two or more seed-boxes, I J, and rotary harrow H, substantially as and for the purpose set forth.

STEPHEN R. HUNTER.

Witnesses:
P. BAEDE DAVIS,
DE FOREST B. DAVIS.